United States Patent [19]

Battlogg

[11] Patent Number: 5,502,866
[45] Date of Patent: *Apr. 2, 1996

[54] WINDSHIELD WIPER SYSTEM WITH BLADE ASSEMBLY DRIVE FOR MAINTAINING A CONSTANT ATTACK ANGLE OF THE WIPER BLADE ON A CURVED A WINDSHIELD

[76] Inventor: Stefan Battlogg, Haus Nr. 26, A-6771 St. Anton Im Montafon, Austria

[*] Notice: The term of this patent shall not extend beyond the expiration date of Pat. No. 5,384,932.

[21] Appl. No.: 323,074

[22] Filed: Oct. 13, 1994

Related U.S. Application Data

[62] Division of Ser. No. 39,808, filed as a PCT/AT91/00103, Sep. 20, 1991, Pat. No. 5,384,932.

[30] Foreign Application Priority Data

Oct. 4, 1990 [AT] Austria ................ 2001/90

[51] Int. Cl.$^6$ ................ B60S 1/40; B60S 1/44
[52] U.S. Cl. ................ 15/250.23; 15/250.21; 15/250.33; 15/250.37; 15/250.29; 15/250.32
[58] Field of Search ................ 15/250.23, 250.21, 15/250.33, 250.20, 250.31, 250.32, 250.35, 250.30, 103, 250.42

[56] References Cited

U.S. PATENT DOCUMENTS

| | | | |
|---|---|---|---|
| 2,412,319 | 12/1946 | Carey | 15/250.23 |
| 2,824,331 | 2/1958 | Wallis | 15/250.36 |
| 2,859,466 | 11/1958 | Sanden | 15/250.42 |
| 2,979,425 | 4/1961 | Krohm | 15/250.23 |
| 3,006,788 | 10/1961 | Krohm | 15/250.21 |
| 3,035,296 | 5/1962 | Deibel | 15/250.23 |
| 4,546,518 | 10/1985 | Harbison et al. | 15/250.23 |
| 4,858,268 | 8/1989 | Shirato | 15/250.21 |

FOREIGN PATENT DOCUMENTS

| | | |
|---|---|---|
| 0021914 | 7/1981 | European Pat. Off. . |
| 0351528 | 1/1990 | European Pat. Off. . |
| 0330663 | 6/1990 | European Pat. Off. . |
| 2490565 | 9/1980 | France . |
| 457809 | 12/1956 | United Kingdom . |
| 790775 | 2/1958 | United Kingdom . |
| 2225218 | 5/1990 | United Kingdom . |
| 88/03486 | 5/1988 | WIPO . |
| 90/11209 | 10/1990 | WIPO . |

*Primary Examiner*—Gary K. Graham
*Attorney, Agent, or Firm*—Herbert L. Lerner; Laurence A. Greenberg; Werner H. Stemer

[57] ABSTRACT

A windshield wiper system for vehicles with a windshield having a curved surface with a curvature across the width of the vehicle is disclosed. The system comprises at least one driven wiper arm. A wiper blade assembly is mounted on a free end of the wiper arm. The wiper blade assembly defines a longitudinal axis and it is mounted pivotally about an axis parallel to the longitudinal axis. An oscillating drive oscillating the wiper arm across the windshield. A pivot drive is connected to said wiper blade assembly and it is adapted for driving the wiper blade assembly in accordance with an oscillatory movement of said wiper arm. The pivot drive includes a cam follower for pivoting the wiper blade assembly relative to said wiper arm and for maintaining a substantially constant attack angle of the wiper blade assembly relative to the windshield surface during the oscillatory movement of the wiper arm. The cam surface on which the cam follower rides may be defined by the surface of the windshield or by a separately provided cam member.

2 Claims, 5 Drawing Sheets

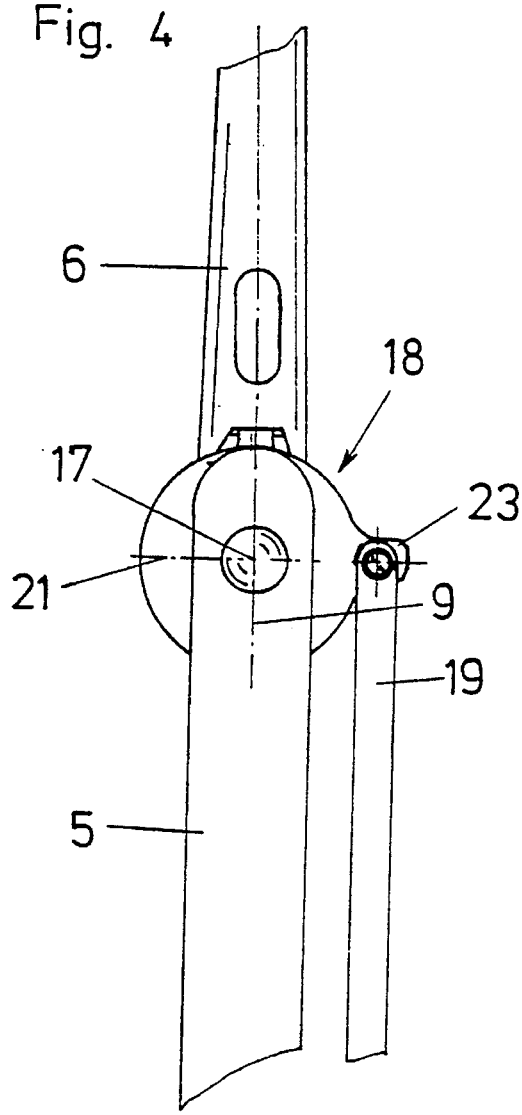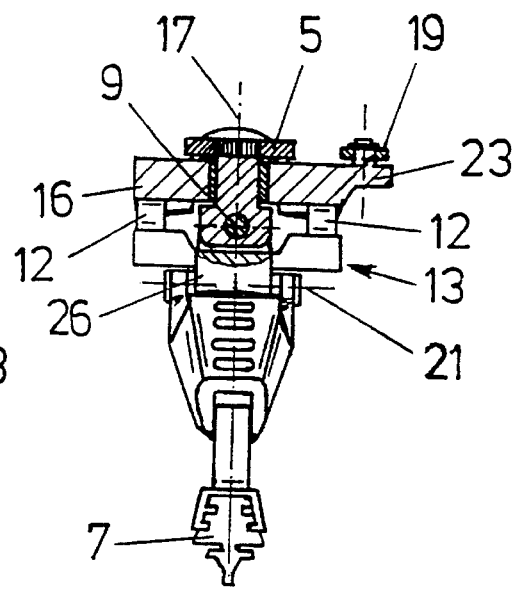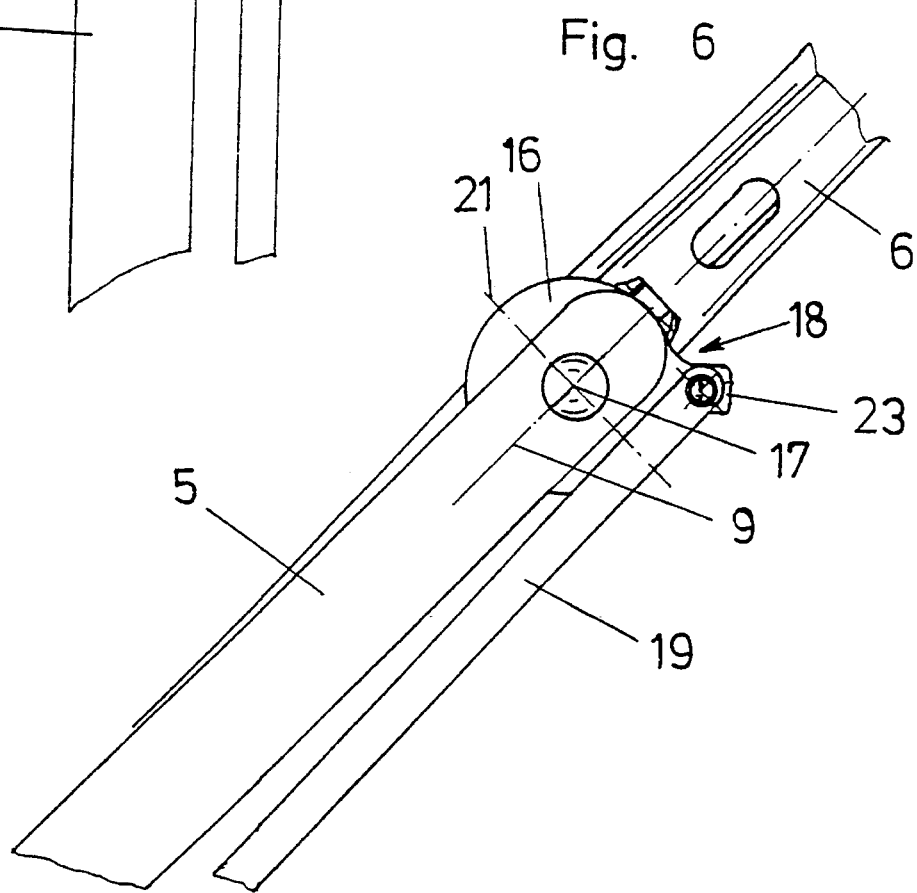

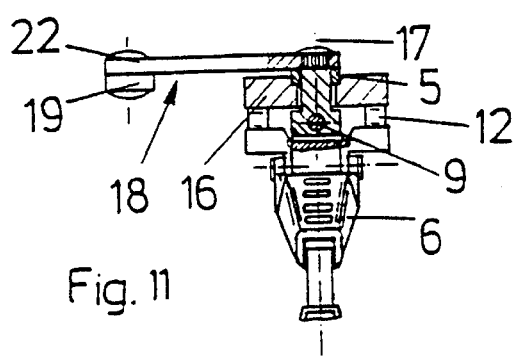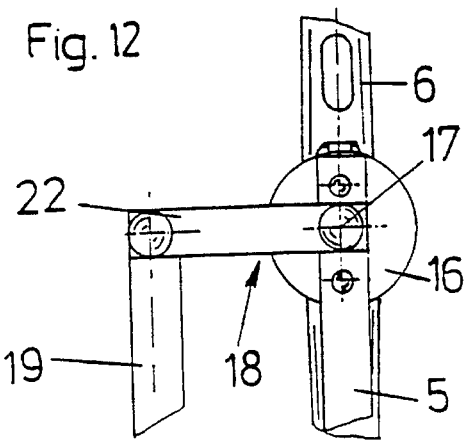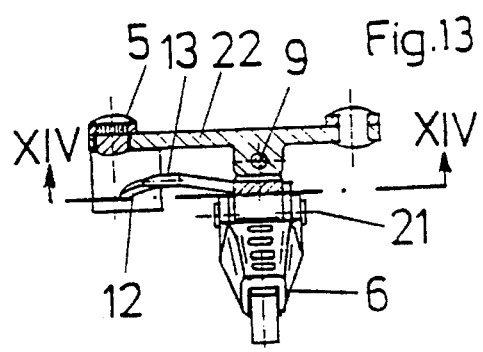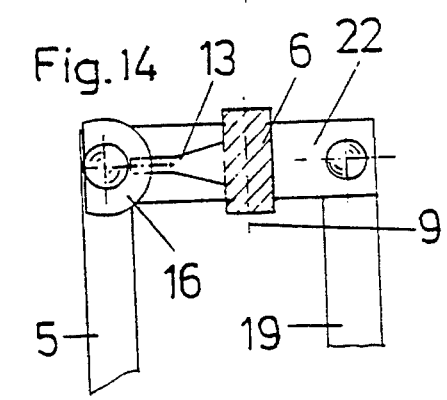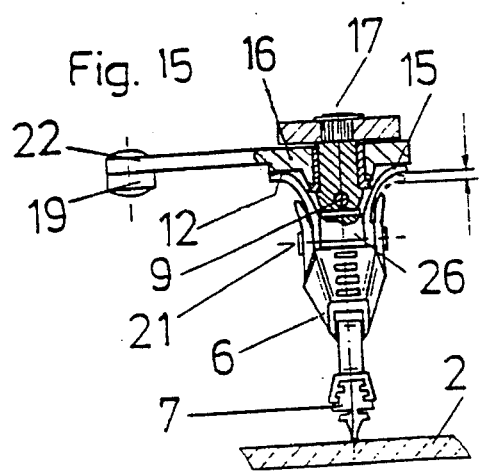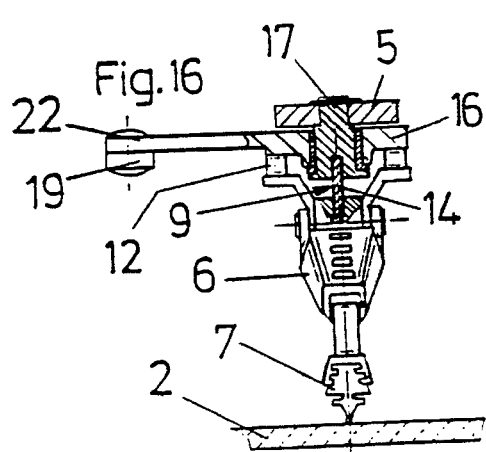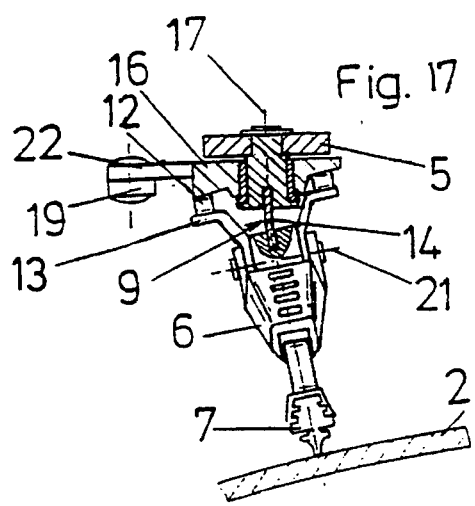

WINDSHIELD WIPER SYSTEM WITH BLADE ASSEMBLY DRIVE FOR MAINTAINING A CONSTANT ATTACK ANGLE OF THE WIPER BLADE ON A CURVED A WINDSHIELD

CROSS-REFERENCE TO RELATED APPLICATION

This application is a division of application Ser. No. 08/039,808, filed Mar. 30, 1993, now U.S. Pat. No. 5,384,432; which was a Continuation of International Application PCT/AT91/00103, filed Sep. 20, 1991.

BACKGROUND OF THE INVENTION

1. Field of the Invention

The invention relates to a windshield wiper system for vehicles with a windshield which is curved transversely, i.e. it is curved across its width. The system is provided with at least one driven wiper arm on whose free end a wiper blade is mounted. The wiper blade is caused to pivot about a longitudinal axis parallel to the wiper blade. A pivot drive for the wiper blade is derived from the wiper arm movement.

Particularly passenger vehicles have windshields with an arch across their width. The arch usually becomes steeper at the lateral regions. A wiper arm which only oscillates across the arched window therefore only has one position in which the wiper blade lies vertically on the window, while all other positions within the wiping area result in a deviation from the 90° position. That deviation from the vertical, also called the normal error, influences the wiping quality, the reorientation characteristic of the wiper rubber in the reversal points and the aerodynamic properties of the wiper system.

2. Description of the Related Art

It has been attempted, therefore, to provide windshield wiper systems in which the wiper blade is pivoted in addition to the oscillatory motion. A windshield wiper of the above-mentioned type has become known from EP-A 351 528, for example, in which pivoting of the wiper blade on the wiper arm in dependence on the oscillation angle of the wiper arm is caused by a bendable shaft which is fixed at one end. While this leads to a change in the attack angle of the wiper blade, it does not consider the windshield curvature, however. The attack angle will remain approximately constant in this only in those special instances in which the windshield curvature follows the pivoting of the wiper blade on the wiper arm. This is generally not the case in the lateral edge regions, however, as can be seen in FIG. 2 of EP-A 351 528.

U.S. Pat. Nos. 3,006,788 and 2,979,425 show structures in which the wiper arm is formed of two parts and the part carrying the wiper blade is pivotable in a second part by means of a rod assembly which is slidable in a non-linear slaving guide.

In the windshield wiper according to U.S. Pat. No. 4,858,268, a pivoting of the wiper arm takes place in dependence on its oscillation about a transverse axis. Only a curvature of the windshield in a direction of the transverse axis is considered.

Finally, windshield wipers are known from EP-A 21 914 and 330 663, whose wiper arm or the wiper arm part carrying the wiper blade are pivoted about its longitudinal axis, whereby a control cam and a cam follower element are provided in the region of the wiper arm oscillation bearing. These two embodiments are able to keep the normal error at least small, as long as the wiper blade extends approximately parallel to the wiper arm. In reality, however, this parallelism is given only with few windshield wipers, since substantial angles are present between the wiper blade and the wiper arm in the parking position and for a best possible coverage of the driver's viewing field. Such configurations are particularly unsuited for windshield wiper systems, the wiper blade of which is guided across the windshield substantially parallel and which are rotated relative to the wiper arm for that purpose.

SUMMARY OF THE INVENTION

It is accordingly an object of the invention to provide a windshield wiper system, which overcomes the hereinafore-mentioned disadvantages of the heretofore-known devices of this general type and which makes it possible, independently of the type of system, to keep the normal error at least within acceptable limits or, preferably, to avoid the same altogether.

With the foregoing and other objects in view there is provided, in accordance with the invention, a windshield wiper system for vehicles with a windshield having a curved surface, comprising: at least one driven wiper arm having a free end; a wiper blade assembly mounted on the free end of the wiper arm, the wiper blade assembly defining a longitudinal axis and being pivotally mounted about an axis parallel to the longitudinal axis; an oscillating drive for oscillating the wiper arm across the windshield; and a pivot drive connected to the wiper blade assembly and being adapted for driving the wiper blade assembly in accordance with an oscillatory movement of the wiper arm; the pivot drive including cam follower means for pivoting the wiper blade assembly relative to the wiper arm and for maintaining a substantially constant angle of the wiper blade assembly relative to the windshield during the oscillatory movement of the wiper arm.

In other words, the objects of the invention are solved in that the oscillating drive of the wiper blade includes a not-pivotally mounted control cam and a cam follower which is guided along the control cam during the oscillatory motion of the wiper arm and which is disposed on the wiper blade.

A configuration is thus attained which, independently of the position of the wiper arm, does not alter the orientation of the curvature axes determining the control cam relative to the vehicle. The pivot axis which usually extends at the free end vertically to the wiper blade, thereby lies in front of or behind, or above or below the additional pivot axis according to the invention, so that a kind of universal joint is formed between the wiper arm and the wiper blade. It is also possible that the two pivot axes intersect.

In accordance with an added feature of the invention, the cam follower means are formed of at least one support roller disposed laterally of the wiper blade assembly and rotatable about an axis substantially parallel to the wiper blade assembly, the support roller following the surface of the windshield during the oscillatory movement of the wiper arm. This is a structurally particularly simple embodiment, as it provides for the control cam to be formed by the arched windshield itself and that the cam follower is provided in the form of support rollers rolling on the windshield, which rollers are disposed laterally of the wiper blade. The support rollers which, in particular, are mounted on spring arms or dump irons attached to the wiper blade, follow the curvature of the windshield. This assures the pivoting of the wiper blade during the oscillatory motion of the wiper arm and thus the maintaining of the vertical attack angle.

In accordance with an additional feature of the invention, the at least one support roller are two support rollers disposed mutually opposite one another across the wiper blade assembly.

In accordance with a further feature of the invention, the windshield wiper system includes a springy arm resiliently connecting the at least one support roller to the wiper blade assembly.

In accordance with yet an added feature of the invention, cam means are disposed on the free end of the wiper arm, the cam means being formed of a plate having a cam surface, and the cam follower riding on the cam surface.

It is thus a second embodiment in which the control cam may be moved together with the wiper arm when the two pivot drives are mechanically coupled. A preferred embodiment provides that the control cam is formed on a plate mounted on the free end of the wiper arm.

Depending on the construction of the windshield wiper system, two preferred embodiments result. In the first embodiment, the plate is mounted at the free end of the wiper arm and it is rotatable about an axis parallel to the wiper arm oscillation axis and it is non-rotatably, i.e. linearly guided during the wiper arm oscillatory motion. This embodiment is particularly suited for windshield wiper systems in which the wiper blade maintains its position relative to the wiper arm during the wiper arm oscillation, i.e. the wiper blade swings with the wiper arm.

In accordance with yet an additional feature of the invention, the windshield wiper system includes a shaft disposed on the free end of the wiper arm, the plate being pivotally mounted on the shaft, the wiper arm oscillating about an oscillatory axis during the oscillatory motion and the shaft extending parallel to the oscillatory axis, and including means for maintaining the plate at a substantially constant orientation angle relative to the windshield during the oscillatory motion of the wiper arm.

In accordance with yet a further feature of the invention, the plate is non-rotatably mounted on the shaft, the wiper arm oscillates about an oscillatory axis during the oscillatory motion and the shaft extends parallel to the oscillatory axis, and including means for rotating the wiper blade assembly about the shaft during the oscillatory motion of the wiper arm.

In accordance with again an added feature of the invention, the pivot drive further includes parallel guide means operatively connected to the plate for guiding the plate. In a preferred embodiment, the parallel guide means include a parallelogram control lever articulated at a pivot point being stationary with respect to the motor vehicle.

In accordance with again an additional feature of the invention, the system including means for altering a length of the wiper arm during the oscillatory motion, the means being in the form of a control drive and, in a preferred embodiment, the parallel guide is formed by a part of the control drive.

With the objects of the invention in view, there is further provided, in accordance with the invention, a windshield wiper system for vehicles with a windshield having a curved surface, comprising: at least one driven wiper arm oscillating about an oscillatory axis being stationary relative to the vehicle, the wiper arm having a free end opposite the oscillatory axis; a bearing member disposed at the free end and being rotatable about a bearing member axis parallel to the oscillatory axis; a wiper blade assembly mounted on the bearing member; oscillatory drive means for oscillating the wiper arm; pivot means for pivoting the wiper blade assembly about an axis parallel to the wiper blade assembly, the pivot means including a cam having a cam surface and a cam follower following the cam surface during a rotation of the wiper blade assembly relative to the wiper arm, the pivot means defining an attack angle of the wiper blade assembly relative to the surface of the windshield.

In accordance with a concomitant feature of the invention, the system includes means for rotating the wiper blade assembly relative to the wiper arm having a parallel guide translating an oscillatory motion of the wiper arm into a rotating motion of the wiper blade assembly relative to the wiper arm.

The second preferred embodiment provides for the plate to be non-rotatably mounted on the free end of the wiper arm and for the wiper blade to be rotatable in the wiper arm about an axis parallel to the wiper arm oscillatory axis. In this embodiment of the wiper system, the wiper blade sweeps essentially the entire surface of the windshield during the pivoting motion of the wiper arm and it rotates relative to the wiper arm. In other words, the blade sweeps the windshield essentially horizontally, while maintaining a vertical orientation.

In both embodiments, a parallel guide for the wiper arm oscillatory drive may be used for guiding the plate or the wiper arm. The parallel guide can, in the case of a rotatably mounted plate, be formed by a parallelogram lever which is articulated at a stationary point with respect to the vehicle, or it can, in the case of a plate non-rotatably mounted on the wiper arm, be formed as a part of a control drive which alters the length of the wiper arm and which is necessary for guiding the wiper blade parallel to the lower windshield edge.

Instead of coupling with the pivot drive of the wiper arm, it is also possible to provide a separate control drive.

Other features which are considered as characteristic for the invention are set forth in the appended claims.

Although the invention is illustrated and described herein as embodied in a windshield wiper system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 4 is a partial top-plan view of a second embodiment of the wiper blade mounting in a central operating position;

FIG. 5 is a sectional view similar to that of FIG. 3 of the embodiment of FIG. 4;

FIG. 6 is a partial top-plan view of the embodiment of FIG. 4 in an operating position pivoted to the right-hand side;

FIG. 11 is a partial sectional view of a fourth embodiment;

FIG. 12 is a top-plan view of the embodiment of FIG. 11;

FIG. 13 is a view similar to FIG. 11 of a fifth embodiment;

FIG. 14 is a view similar to FIG. 12 of the embodiment of FIG. 13;

FIG. 15 is a partial sectional view of a sixth embodiment;

FIGS. 16 and 17 are partial sections of a central operating position and an operating position pivoted to the right-hand side, respectively, of a seventh embodiment.

DESCRIPTION OF THE PREFERRED EMBODIMENTS

Figure 1:
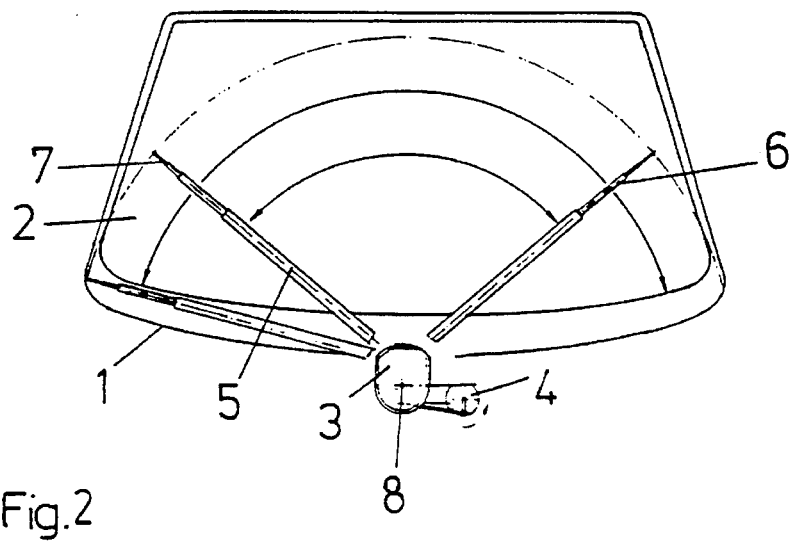
FIG. 1 is a top-plan view of a windshield of a motor vehicle with a first embodiment of the windshield wiper system according to the invention.
Figure 2:
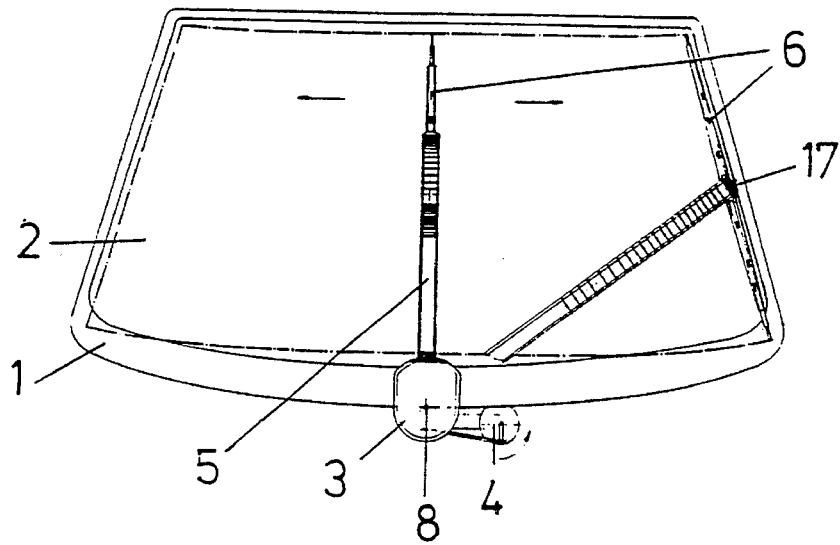
FIG. 2 is a top-plan view of a windshield of a motor vehicle with a second embodiment of the windshield wiper system.

Referring now to the figures of the drawing in detail and first, particularly, to FIGS. 1 and 2 thereof, there is seen a motor vehicle 1 with a windshield 2. The windshield 2 is curved transversely from one side of the vehicle 1 to the other side, i.e. along its width. In the windshield wiper systems according to the invention, the normal error, i.e. the deviation of the wiper blade from a vertical attack angle on the vehicle windshield 2, is reduced or avoided. The windshield wiper systems can be embodied as single-arm or as double-arm wipers, whereby the wiper blade of FIG. 1 may be rotated about a wiper arm oscillatory axis 8 or the wiper blade of FIG. 2 may be guided essentially parallel to the lower edge of the windshield 2. An oscillatory drive 3 with a drive motor 4 is installed in a known manner below the vehicle windshield 2 on the vehicle 1, and a wiper arm 5 oscillates about the wiper arm oscillatory axis 8; several positions are illustrated in FIGS. 1 and 2, respectively.

Figure 3:
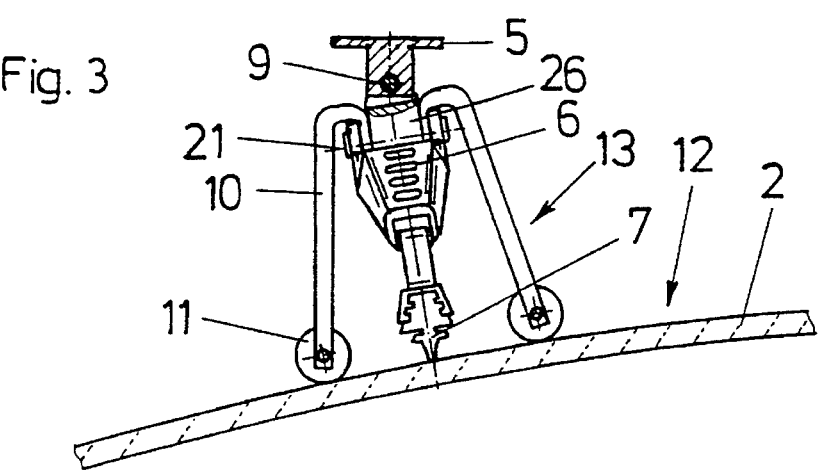
FIG. 3 is a partial sectional view through the wiper arm in a first embodiment.

With reference to FIG. 3, a wiper blade assembly 6, in the following also referred as a wiper blade 6, is pivotable at the free end of the wiper arm 5 about a transverse axis 21 and about a longitudinal axis 9 which extends parallel to the wiper blade 6, and, in the embodiment of FIG. 1, extends substantially parallel to the wiper arm 5.

In the embodiment of FIG. 2 the blade 6 is additionally rotatable about a shaft 17, which is oriented parallel to a wiper arm oscillatory axis 8. The pivotability about the longitudinal axis 9, which is parallel to the wiper blade 6, makes for the avoidance of the normal error, i.e. it helps maintain a position of the wiper blade 6 with a wiper rubber 7 which is vertical to the vehicle windshield, independently of the curvature of the windshield 2 and its angle relative to the wiper arm 5 and the wiper arm oscillatory axis 8.

Various possibilities are proposed by this inventor for maintaining or guiding the wiper blade 6 with an attack angle of about 90° relative to the windshield 2. With reference to FIG. 3, for instance, there are provided spring arms 10 or dump irons 10 laterally mounted on a support member 26 or bearing member 26 of the wiper blade 6. The wiper blade assembly is pivotable about the longitudinal axis 9. Support rollers 11 are mounted at the springy dump irons 10 on a level with the wiper rubber 7. The windshield 2 is used as a control cam and the rollers 11 serve as cam followers 13. The support rollers 11 roll on the windshield 2, i.e. the cam 12 during the oscillatory motion of the wiper arm 5, so that the normal position of the wiper blade 6 is assured. Again, the wiper blade 6 is disposed centrally between the support rollers 11 and it lies on the windshield 2. The embodiment of FIG. 3 is particularly well suited for windshield wiper systems according to FIG. 1 with either one or two wiper arms 5.

With reference to FIGS. 4–6, the second embodiment shown therein serves for such windshield wiper systems in which the control cam 12 is provided on a plate 16 or disk 16. The plate 16 is mounted on the free end of the wiper arm 5, rotatably about a shaft 17, which is parallel to the wiper arm oscillatory axis 8, and it is provided with a parallel guide 18. The parallel guide 18 comprises a parallelogram control lever 19, which is articulated at an extension 23 of the plate 16. When the wiper arm 5 is rotated, as can be seen from a comparison between FIGS. 4 and 6, the plate 16, and thus the control cam 12 disposed on the wiper arm at the lower end of the plate 16, is also pivoted. A cam follower 3 provided on the mounting member 26 of the wiper blade 6 lies on the control cam 12. The cam follower 13 comprises two laterally extending fingers or rollers. The wiper blade 6, which is non-pivotally mounted on the wiper arm 5, is thus pivoted when the wiper arm 6 pivots about the longitudinal axis 9, so that the normal position of the wiper blade 6 is nearly assured, or when the control cam is adapted to the curvature of the windshield 2, it is exactly assured.

Figure 9:
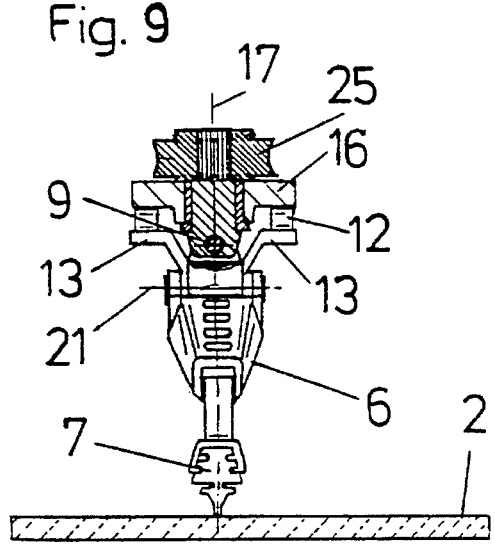
FIGS. 9 and 10 are partial sections of a central operating position and an operating position pivoted to the right-hand side, respectively, of the embodiment of FIG. 7.
Figure 10:
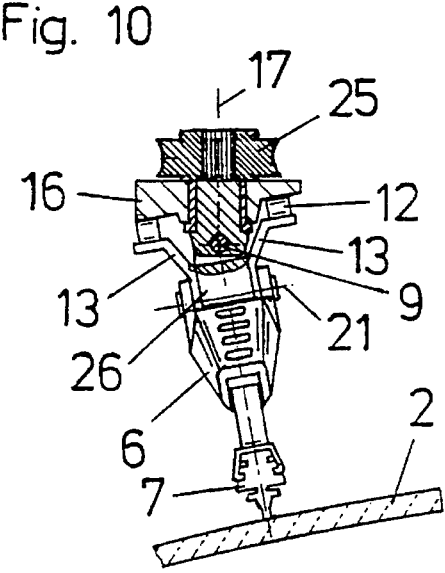

With reference to FIGS. 7–10, a wiper arm used in the windshield wiper systems according to FIG. 2, alters its length with the oscillatory angle. This assures full-surface coverage of the windshield 2. A control drive with a cable line drive, which is not described in detail in this context, serves as the parallel guide 18 for the rotation of the wiper blade 6 about the shaft 17. The shaft 17 extends parallel to the wiper arm oscillatory axis 8 and it is mounted in the free end of the wiper arm 5. The control drive, which also causes the length change in the wiper arm 5, includes a drive worm 24 which is driven by the cable line drive and which meshes with a worm gear 25 disposed on the shaft 17. The plate 16 providing the control cam 12 is formed on the lower side of the wiper arm 5. Force-guided fingers or rollers provided on the mounting member 26 of the wiper blade 6 serve as the cam follower 13. The parallel guide 18 necessary for the pivoting of the wiper blade 6 relative to the wiper arm 5 is thus also used for pivoting the wiper blade 6 about the longitudinal axis 9 (FIGS. 9, 10). An adaptation of the control cam 12 to the respective curvature of the windshield 2 leads to an exact maintaining of the normal position of the wiper blade 6 in this embodiment as well.

The embodiments according to FIGS. 11–14 show variations of a parallel-guided wiper blade 6 for windshield wiper systems according to FIG. 2. The difference of the embodiment of FIG. 11 and 12 with respect to the embodiment of FIGS. 4-6 lies in the fact that the plate 16 carrying the control cam 2 is rigidly (non-pivotally) connected with the wiper arm 5, and that the parallelogram control lever 19 rotates the wiper blade 6 via a side bar 22. In FIGS. 13 and 14, the longitudinal axis 9 of the wiper blade 6 is disposed in the side bar 22, which connects the wiper arm 5 with the parallelogram control lever 19 of the parallel guide 18. Here, the control cam 12 is provided on the wiper arm 5 and/or on the parallelogram control lever 19 and it is followed by the cam follower 13 projecting from the wiper blade 6.

Since non-pivotable and pivotable parts are interchangeable in order to equip the windshield wiper systems of FIGS.

1 or 2 in accordance with the invention, they are not specifically defined in the two embodiments of FIGS. 15–17. The plate 16 may thus either be a rigid part of the wiper arm 5 or it may be mounted thereon rotatably about the shaft 17.

Correspondingly, a parallelogram guide connects to either the wiper blade 6, which is mounted pivotally about the shaft 17, or on the rotatably mounted plate 16. In FIG. 15, the cam follower 13 following the cam 12 is formed by springy arms 15. This provides a resilient cross-over of the wiper blade 6 at the reversal points and also simultaneous dampening for the wiper blade 6. This reduces wiper noise and so-called rattling of the wiper blade is avoided, which is also attained with the embodiment of FIG. 3 by means of the spring arms 10. In the embodiment of FIGS. 16 and 17, the longitudinal axis 9 is not formed by a mounting pin, but by a spring leaf 14, which is inserted into the wiper blade 6 and into the shaft 17.

Figure 7:
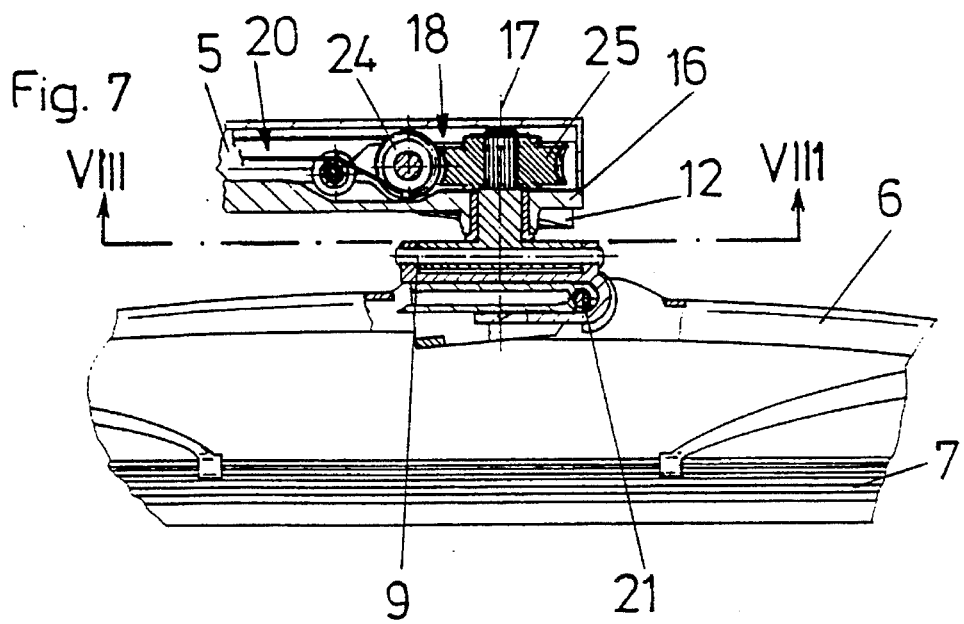
FIG. 7 is a partial longitudinal section through a third embodiment of the wiper blade mounting.
Figure 8:
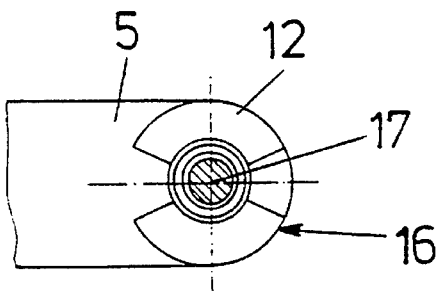
FIG. 8 is a section along the line VIII—VIII of FIG. 7.
Figure 18:
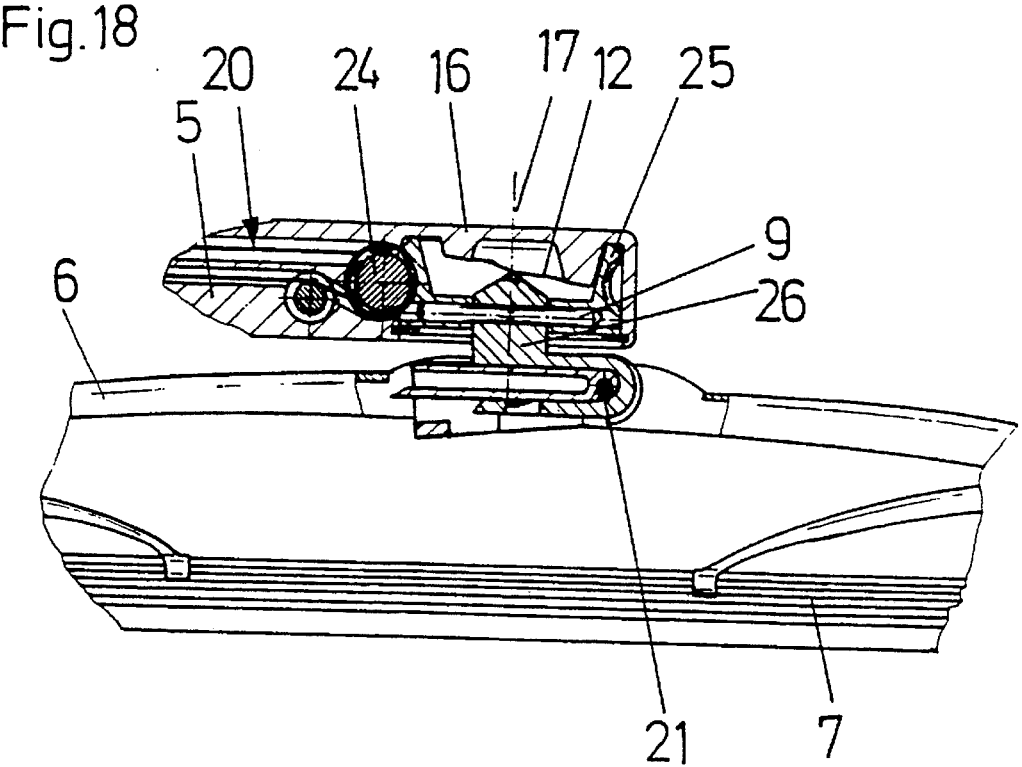
FIGS. 18–20 are views similar to those of FIGS. 7, 9 and 10 of an eighth embodiment of the invention.
Figure 19:
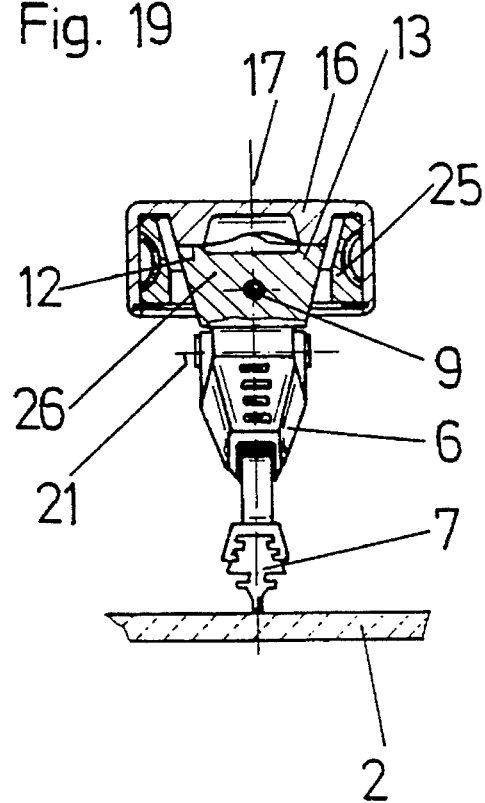
Figure 20:
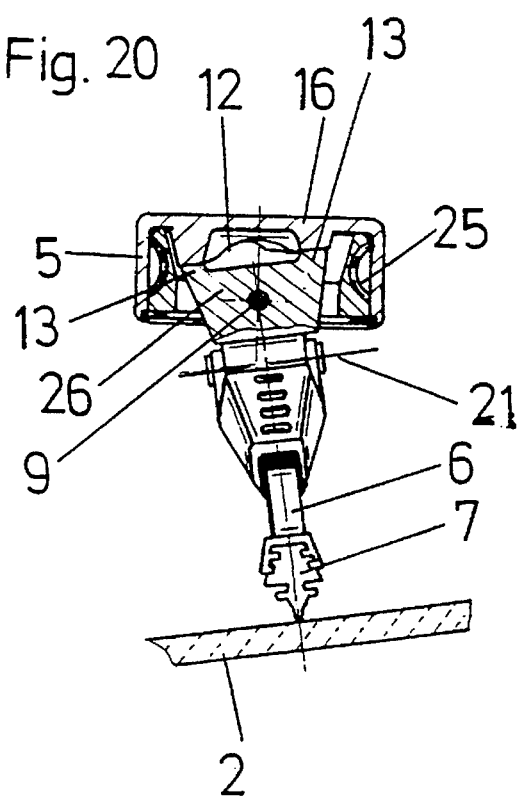

In FIGS. 18–20, which essentially correspond to FIGS. 7, 9 and 10, a drive worm 24 is driven through a control drive 20 with a cable line. The worm 24 meshes with a worm gear 25. In the gear 25, the longitudinal axis 9 is provided in which the wiper blade 6 is supported. The cam followers 13 protrude upwardly from the mounting part 26 of the wiper blade 6, into the inside of the worm gear 25. They glide along the control cam 12, which is provided on the inside of the wiper arm 5 or its outer cover. This embodiment is characterized by a smaller height as compared to FIGS. 7–10.

In all of the embodiments, the wiper blade 6, due to the pivot axes 9 and 21, which are orthogonal relative to one another, has a universal joint-like suspension, which makes it possible in cooperation with the control cam 12 adapted to the windshield or the windshield itself to maintain the attack angle of the wiper blade 6 on the windshield 2 at least substantially constant during the entire wiper arm movement. The angle between the wiper blade 6 and the wiper arm 5 is thereby of no consequence.

I claim:

1. Windshield wiper system for vehicles with a windshield having a curved surface, comprising:

at least one elongated wiper arm mounted for oscillation about an oscillatory axis and having a free end;

an elongated wiper blade assembly defining a longitudinal axis, said wiper blade assembly being pivotally mounted on said free end of said wiper arm about an axis parallel to said longitudinal axis;

an oscillating drive for oscillating said wiper arm about said oscillatory axis across the windshield;

a shaft disposed on said free end of said wiper arm, said shaft defining a longitudinal shaft axis extending parallel to said oscillatory axis, said wiper blade assembly being coupled to said shaft; and pivot drive means connected to said wiper blade assembly for driving said wiper blade assembly about said axis parallel to said longitudinal axis as a function of an oscillatory position of said wiper arm;

said pivot drive means including a cam with a cam surface pivotally disposed on said shaft and cam follower means disposed on said wiper blade assembly, said cam surface riding on said cam follower means for pivoting said wiper blade assembly about said axis parallel to said longitudinal axis relative to said wiper arm and for maintaining a substantially constant attack angle of said wiper blade assembly relative to the windshield during the oscillatory movement of said wiper arm.

2. The windshield wiper system according to claim 1, wherein said cam is formed of a plate.

* * * * *